United States Patent
Isobe et al.

(10) Patent No.: US 10,859,467 B2
(45) Date of Patent: Dec. 8, 2020

(54) BEARING DIAGNOSING DEVICE AND BEARING DIAGNOSING METHOD

(71) Applicant: FANUC CORPORATION, Yamanashi (JP)

(72) Inventors: Gaku Isobe, Yamanashi-ken (JP); Yuuzou Inaguchi, Yamanashi-ken (JP)

(73) Assignee: FANUC CORPORATION, Yamanashi (JP)

(*) Notice: Subject to any disclaimer, the term of this patent is extended or adjusted under 35 U.S.C. 154(b) by 0 days.

(21) Appl. No.: 16/118,802

(22) Filed: Aug. 31, 2018

(65) Prior Publication Data

US 2019/0072457 A1    Mar. 7, 2019

(30) Foreign Application Priority Data

Sep. 1, 2017 (JP) ................. 2017-168121

(51) Int. Cl.
| | |
|---|---|
| *G01M 13/04* | (2019.01) |
| *G07C 3/00* | (2006.01) |
| *G01M 5/00* | (2006.01) |
| *G05B 19/4065* | (2006.01) |

(52) U.S. Cl.
CPC .......... *G01M 13/04* (2013.01); *G01M 5/0033* (2013.01); *G05B 19/4065* (2013.01); *G07C 3/00* (2013.01)

(58) Field of Classification Search
CPC ............. B23C 2260/80; B23Q 17/007; B23Q 17/0957; B23Q 1/70; B23Q 17/008; B23Q 3/157; G01M 13/04; G05B 19/4065; Y10T 408/165; G08B 21/187; G08B 25/08

USPC ......... 73/862.041, 862.321, 862.322; 702/34
See application file for complete search history.

(56) References Cited

U.S. PATENT DOCUMENTS

| | | | |
|---|---|---|---|
| 2012/0109539 A1 | 5/2012 | Hasegawa et al. | |
| 2015/0051846 A1 | 2/2015 | Masuya | |
| 2016/0297043 A1 | 10/2016 | Inaguchi | |

(Continued)

FOREIGN PATENT DOCUMENTS

| | | |
|---|---|---|
| CN | 1553989 A | 12/2004 |
| CN | 1688874 A | 10/2005 |
| CN | 102589883 A | 7/2012 |

(Continued)

OTHER PUBLICATIONS

English Abstract and Machine Translation for Japanese Publication No. 2014-228378 A, published Dec. 8, 2014, 16 pgs.

(Continued)

*Primary Examiner* — John Fitzgerald
*Assistant Examiner* — Truong D Phan
(74) *Attorney, Agent, or Firm* — Fredrikson & Byron, P.A.

(57) ABSTRACT

A bearing diagnosing method for diagnosing degradation of a bearing rotatably supporting a spindle includes: the steps of obtaining the rotation speed of the spindle; obtaining the temperature of the bearing; recording the rotation time for which the spindle has rotated, at each of multiple classes that are defined in advance by combination of rotation speed range and temperature range, into the storage unit, based on the rotation speed and the temperature; and calculating bearing degradation information representing the degree of degradation of the bearing, based on the rotation time at each of the classes, stored in the storage unit.

13 Claims, 4 Drawing Sheets

(56) References Cited

U.S. PATENT DOCUMENTS

2019/0049939 A1* 2/2019 Kato .................. G05B 23/0221

FOREIGN PATENT DOCUMENTS

| | | | |
|---|---|---|---|
| CN | 106248380 | A | 12/2016 |
| JP | 2001289738 | A | 10/2001 |
| JP | 2002346884 | A | 12/2002 |
| JP | 2003150237 | A | 5/2003 |
| JP | 200530543 | A | 2/2005 |
| JP | 200577111 | A | 3/2005 |
| JP | 200963397 | A | 3/2009 |
| JP | 201292910 | A | 5/2012 |
| JP | 2014228378 | * | 12/2014 |
| JP | 2014228378 | A | 12/2014 |
| JP | 201536675 | A | 2/2015 |
| JP | 2016200523 | A | 12/2016 |

OTHER PUBLICATIONS

English Abstract and Machine Translation for Japanese Publication No. 2001-289738 A, published Oct. 19, 2001, 9 pgs.
English Abstract and Machine Translation for Japanese Publication No. 2003-150237 A, published May 23, 2003, 16 pgs.
English Abstract and Machine Translation for Japanese Publication No. 2005-077111 A, published Mar. 24, 2005, 9 pgs.
English Abstract and Machine Translation for Japanese Publication No. 2009-063397 A, published Mar. 26, 2009, 9 pgs.
English Abstract and Machine Translation for Japanese Publication No. 2005-030543 A, published Feb. 3, 2005, 10 pgs.
Untranslated Decision to Grant a Patent mailed by Japan Patent Office (JPO) for Application No. 2017-168121, dated Aug. 27, 2019, 3 pgs.
English Machine Translation of Decision to Grant a Patent mailed by Japan Patent Office (JPO) for Application No. 2017-168121, dated Aug. 27, 2019, 2 pgs.
Untranslated Notice of Reasons for Refusal mailed by Japan Patent Office (WO) for Application No. 2017-168121, dated May 7, 2019, 3 pgs.
English Machine Translation of Notice of Reasons for Refusal mailed by Japan Patent Office (JPO) for Application No. 2017-168121, dated May 7, 2019, 3 pgs.
English Abstract and Machine Translation for Japanese Publication No. 2002-346884 A, published Dec. 4, 2002, 6 pgs.
English Abstract for Japanese Publication No. 2016200523 A, published Dec. 1, 2016, 2 pgs.
English Abstract for Japanese Publication No. 2015036675 A, published Feb. 23, 2015, 2 pgs.
English Abstract for Japanese Publication No. 2012092910 A, published May 17, 2012, 2 pgs.
English Machine Translation for Chinese Publication No. CN1553989A, published Dec. 8, 2004, 26 pgs.
English Machine Translation for Chinese Publication No. CN1688874A, published Oct. 26, 2005, 92 pgs.
English Machine Translation for Chinese Publication No. CN102589883A, published Jul. 18, 2012, 13 pgs.
English Machine Translation for Chinese Publication No. CN106248380A, published Dec. 21, 2016, 12 pgs.

* cited by examiner

| ROTATION SPEED (ROTATION RATE) V | TEMPERATURE T | ROTATION TIME (CUMULATIVE TIME) S | COEFFICIENT K | ROTATION TIME S' |
|---|---|---|---|---|
| 1~3333 [min⁻¹] | ~50[°C] | -[min] | -[min] | -[min] |
| | 51~90[°C] | -[min] | -[min] | -[min] |
| | 91~130[°C] | -[min] | -[min] | -[min] |
| 3334~6666 [min⁻¹] | ~50[°C] | -[min] | -[min] | -[min] |
| | 51~90[°C] | -[min] | -[min] | -[min] |
| | 91~130[°C] | -[min] | -[min] | -[min] |
| 6667~10000 [min⁻¹] | ~50[°C] | -[min] | -[min] | -[min] |
| | 51~90[°C] | -[min] | -[min] | -[min] |
| | 91~130[°C] | -[min] | -[min] | -[min] |

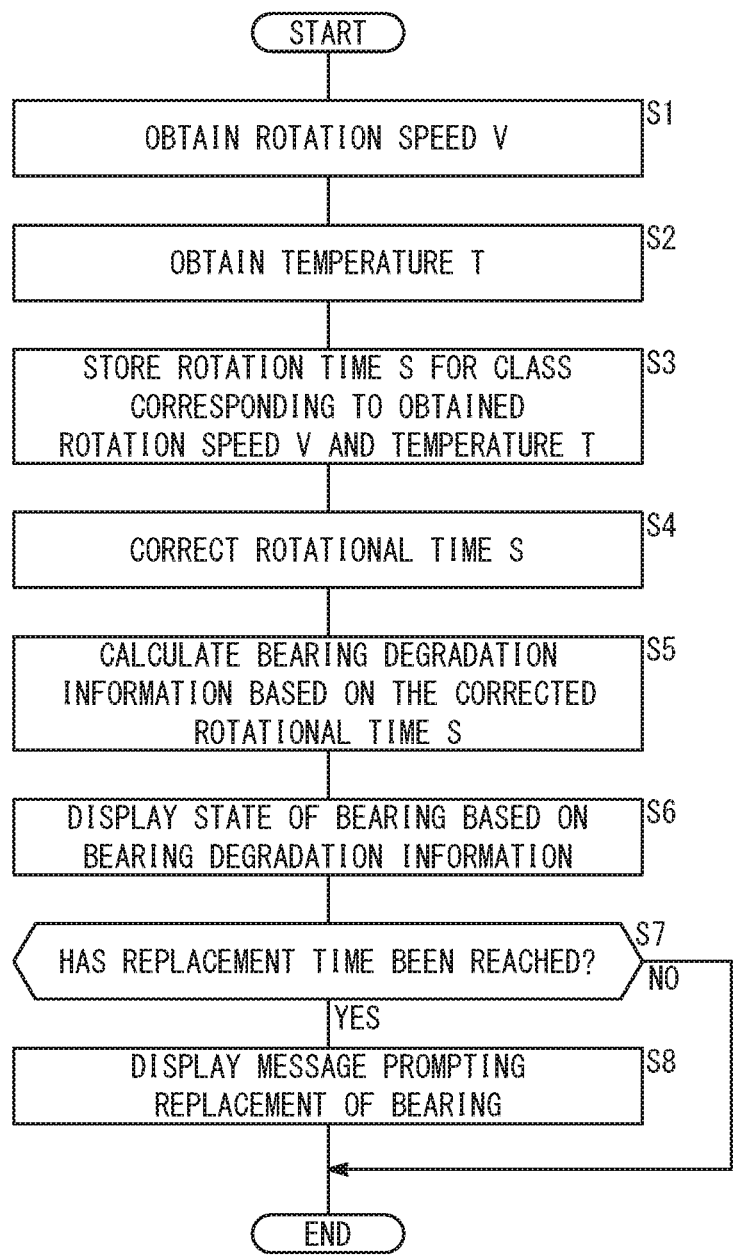

BEARING DIAGNOSING DEVICE AND BEARING DIAGNOSING METHOD

CROSS-REFERENCE TO RELATED APPLICATION

This application is based upon and claims the benefit of priority from Japanese Patent Application No. 2017-168121 filed on Sep. 1, 2017, the contents of which are incorporated herein by reference.

BACKGROUND OF THE INVENTION

Field of the Invention

The present invention relates to a bearing diagnosing device and a bearing diagnosing method for diagnosing a bearing that rotatably supports a spindle.

Description of the Related Art

Japanese Laid-Open Patent Publication No. 2015-036675 discloses a bearing life estimating device. Briefly, in this bearing life estimating device, in order to reflect the influence of the temperature of the bearing on its life, a coefficient is set in advance in accordance with the rotation speed of the spindle. That is, the device estimates the equivalent cumulative amount of rotation on the basis of the rotation amount at a reference rotation speed, by multiplying the actual number of rotation of the spindle at each speed by the associated coefficient, to thereby determine whether the bearing reaches the life end.

SUMMARY OF THE INVENTION

Herein, since the temperature affects deterioration and the life of the bearing, the temperature of the bearing is an important factor for diagnosing the bearing life and the like. However, the bearing temperature is not uniquely determined by the rotation speed of the spindle but can vary depending on various factors. Therefore, it is not possible for the configuration of Japanese Laid-Open Patent Publication No. 2015-036675 to accurately determine whether or not the bearing has reached its life end.

It is therefore an object of the present invention to provide a bearing diagnosing device and a bearing diagnosing method for improving the diagnostic accuracy of a bearing.

According to a first aspect of the present invention, a bearing diagnosing device for diagnosing degradation of a bearing rotatably supporting a spindle of a machine tool, includes: a rotation speed obtainer configured to obtain the rotation speed of the spindle; a temperature obtainer configured to obtain the temperature of the bearing; a spindle operation storage controller configured to record the rotation time for which the spindle has rotated, at each of a plurality of classes that are defined in advance by combination of rotation speed range and temperature range, into the storage unit, based on the rotation speed and the temperature; and a bearing degradation calculator configured to calculate bearing degradation information representing the degree of degradation of the bearing, based on the rotation time at each of the classes, stored in the storage unit.

A second aspect of the present invention resides in a bearing diagnosing method for diagnosing degradation of a bearing rotatably supporting a spindle of a machine tool, comprising: a rotation speed obtaining step of obtaining the rotation speed of the spindle; a temperature obtaining step of obtaining the temperature of the bearing; a spindle operation storage controlling step of recording the rotation time for which the spindle has rotated, at each of a plurality of classes that are defined in advance by combination of rotation speed range and temperature range, into the storage unit, based on the rotation speed and the temperature; and a bearing degradation calculating step of calculating bearing degradation information representing the degree of degradation of the bearing, based on the rotation time at each of the classes, stored in the storage unit.

According to the present invention, the bearing degradation information can be calculated in consideration of the temperature of the bearing. Therefore, the calculation accuracy of the bearing degradation information can be improved, and so can be the diagnostic accuracy of the bearing.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 2 is a diagram showing an example of the table shown in FIG. 1;

FIG. 4 is a flowchart showing the operation of the bearing diagnosing device shown in FIG. 1.

DESCRIPTION OF THE PREFERRED EMBODIMENTS

A bearing diagnosing device and a bearing diagnosing method according to the present invention will be detailed hereinbelow by describing preferred embodiments with reference to the accompanying drawings.

Figure 1:
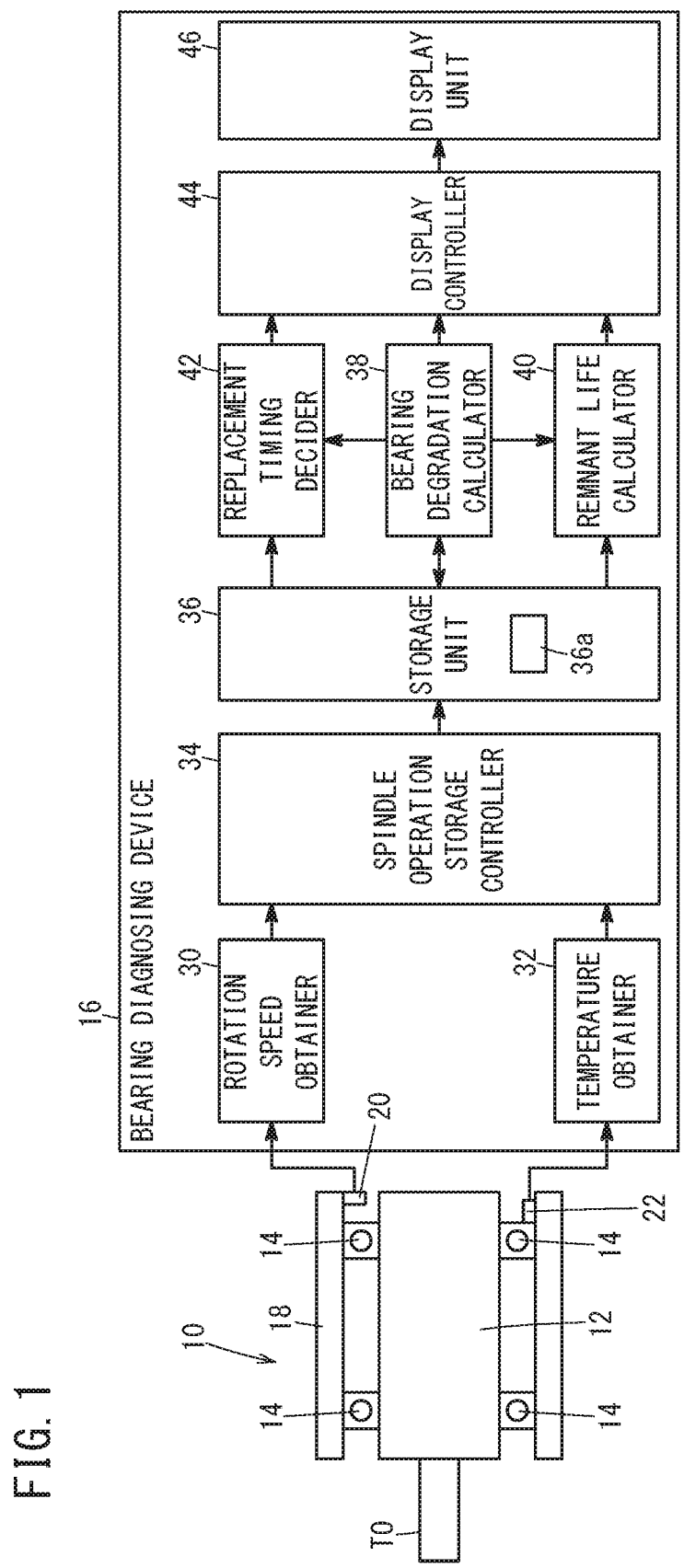
FIG. 1 is a configuration diagram of a bearing diagnosing device for diagnosing a bearing rotatably supporting a spindle of a spindle unit.

FIG. 1 is a configuration diagram of a bearing diagnosing device 16 for diagnosing a bearing 14 rotatably supporting a spindle 12 of a spindle unit 10.

The spindle unit 10 includes a cylindrical housing 18, a spindle 12 and a bearing 14 that rotatably supports the spindle 12 with respect to the housing 18 inside the housing 18. The spindle unit 10 is provided in a machine tool or the like, and for example, a tool TO is attached to one end of the spindle 12. The spindle unit 10 further includes a speed sensor 20 for detecting the rotation speed V of the spindle 12 and a temperature sensor 22 for detecting the temperature T of the bearing 14.

The bearing diagnosing device 16 includes a rotation speed obtainer 30, a temperature obtainer 32, a spindle operation storage controller 34, a storage unit 36, a bearing degradation calculator 38, a remnant life time calculator 40, a replacement timing decider 42, a display controller 44 and a display unit 46.

The rotation speed obtainer 30, based on the detection signal detected by the speed sensor 20, acquires the rotation speed (rotation rate) V of the spindle 12. The rotation speed obtainer 30 may acquire the rotation speed (rotation rate) V of the spindle 12 based on the detection signal of the encoder (rotational position sensor, speed sensor) provided in the spindle motor for rotating the spindle 12. The rotation speed V obtained by the rotation speed obtainer 30 is sent to the spindle operation storage controller 34.

The temperature obtainer 32, based on the detection signal detected by the temperature sensor 22, acquires the temperature T of the bearing 14. It should be noted that the temperature sensor 22 need not be a sensor for directly detecting the temperature T. That is, the temperature sensor 22 may detect a physical quantity used for estimating the temperature T of the bearing 14. In this case, the temperature obtainer 32 may estimate the temperature T of the bearing 14 to acquire the temperature T, based on the detection signal indicating the physical quantity detected by the temperature sensor 22. The temperature T acquired by the temperature obtainer 32 is sent to the spindle operation storage controller 34.

Based on the rotation speed V acquired by the rotation speed obtainer 30 and the temperature T acquired by the temperature obtainer 32, the spindle operation storage controller 34 stores rotation time (operation time) S for which the spindle 12 has rotated at each of classes that are defined in advance by a plurality of predetermined rotation speed ranges (rotation rate ranges) and a plurality of predetermined temperature ranges, into the storage unit 36. The spindle operation storage controller 34 stores the rotation time S accumulated for each class in the storage unit 36. In the following description, the cumulative rotation time S is simply referred to as rotation time S. The rotation time (cumulative time) S for each class is stored in a table 36a of the storage unit 36.

FIG. 2 is a diagram showing an example of the table 36a. In the example shown in FIG. 2, the plurality of rotation speed ranges (rotational rate ranges) include three ranges, namely, the first rotation speed range (1 to 3,333 [$min^{-1}$]), the second rotation speed range (3,334 to 6,666 [$min^{-1}$]), the third rotation speed range (6,667 to 10,000 [$min^{-1}$]). In addition, the plurality of temperature ranges include three ranges, i.e., the first temperature range (up to 50 [° C.]), the second temperature range (51 to 90 [° C.]) and the third temperature range (91 to 130 [° C.]).

Therefore, there are, in total, nine classes that are defined by the three rotation speed ranges (rotation speed ranges) and the three temperature ranges. Specifically, nine classes can be defined, including the class (first class) of the first rotation speed range (1 to 3,333 [$min^{-1}$]) and the first temperature range (to 50 [° C.]), the class (second class) of the first rotation speed range and the second temperature range (51 to 90 [° C.]), the class (third class) of the first rotation speed range and the third temperature range (91 to 130 [° C.]), the class (fourth class) of the second rotation speed range (3,334 to 6,666 [$min^{-1}$]) and the first temperature range, the class (fifth class) of the second rotation speed range and the second temperature range, the class (sixth class) of the second rotation speed range and the third temperature range, the class (seventh class) of the third rotation speed range (6,667 to 10,000 [$min^{-1}$]) and the first temperature range, the class (eighth class) of the third rotation speed range and the second temperature range, and the class (ninth class) of the third rotation speed range and the third temperature range.

For example, when the spindle 12 turns at the rotation speed V of 2,000 [$min^{-1}$], having the temperature T of the bearing 14 at 70 [° C.], the spindle operation storage controller 34 stores the rotation time S of the spindle 12 into the second class. Further, for example, when the rotation speed V of the spindle 12 is 8,000 [$min^{-1}$] and the temperature T of the bearing 14 is 40 [° C.], the spindle operation storage controller 34 stores the rotation time S of the spindle 12 into the seventh class.

In the example shown in FIG. 2, a predetermined coefficient K corresponding to each class is also stored in the table 36a. The coefficient K is defined to correct the rotation time S of each class. The higher the rotation speed (rotation speed) V of the spindle 12 is, the faster the bearing 14 is likely to deteriorate, and the higher the temperature T of the bearing 14 is, the faster the bearing 14 is likely to deteriorate. Therefore, even though the rotation time S for a class is the same as that for another class, the degrees of degradation in the rotation time S for the two classes become different. For this reason, a different coefficient K for correcting the rotation time S is assigned for each class in order to make the rotation time S relatively longer as the rotation speed V and the temperature T become higher. The coefficient K for each class is a weight coefficient that converts the rotation time S for the class into an equivalent rotation time that would produce the same degree of degradation when the spindle 12 is turned at a rotation speed Vs and a temperature Ts corresponding to a predetermined class (any one of the first to ninth classes).

It should be noted that the coefficients K may be stored in a separate table provided in the storage unit 36 in correspondence with associated classes, instead of being stored in the table 36a that stores the rotation time S for each class.

The bearing degradation calculator 38 corrects the rotation time S for each class by multiplying the rotation time S for each class by the associated coefficient K. In order to simplify the explanation, for convenience sake the rotation time S after correction may be denoted by the rotation time S'. The bearing degradation calculator 38 stores the rotation time S' for each class in the table 36a of the storage unit 36. Note that the bearing degradation calculator 38 may store the rotation time S' for each class in another table provided in the storage unit 36, instead of the table 36a storing the rotation time S for the class.

The bearing degradation calculator 38 calculates bearing degradation information by summing the rotation times S' for all the classes. That is, the total time obtained by summing up the rotation times S' for nine classes is the bearing degradation information. This bearing degradation information is the estimated time indicating the degree of degradation of the bearing 14. The bearing degradation calculator 38 outputs the calculated bearing degradation information to the remnant life time calculator 40, the replacement timing decider 42 and the display controller 44.

Based on the bearing degradation information, the remnant life time calculator 40 calculates the remaining usable time (remnant life time) of the bearing 14 until the degree of degradation of the bearing 14 reaches the first level of degradation. The remnant life time calculator 40 calculates the remaining usable time (remnant life time) by subtracting the bearing degradation information from the total usable time (total life time) of the bearing 14. This total usable time is the time for which the bearing 14 can be used from the start of use of the bearing 14 until the degree of degradation of the bearing 14 reaches the first level of degradation on the assumption that the spindle 12 is used at the rotation speed Vs and the temperature Ts corresponding to the predetermined class. Therefore, the total usable time represents the time indicating the first level of degradation. The total usable time (total life time) of the bearing 14 is stored in advance in the storage unit 36. The remnant life time calculator 40 outputs the calculated remaining usable time (remnant life time) to the display controller 44.

The replacement timing decider 42, based on the bearing degradation information, determines whether or not the degree of degradation of the bearing 14 has reached the second level of degradation. When the bearing degradation information exceeds the replacement time representing the second level of degradation, the replacement timing decider 42 determines that the degree of degradation of the bearing 14 has reached the second level of degradation, and decides that the replacement timing of the bearing 14 has been reached. The second level of degradation may be equal to or lower than the first level of degradation. The replacement time representing the second level of degradation is stored in the storage unit 36. When determining that the replacement time has been reached, the replacement timing decider 42 outputs a notice indicating that the replacement time has come, to the display controller 44.

The display controller 44 displays at least one of the bearing degradation information and the remaining usable time on the display unit 46. When displaying the bearing degradation information, the display controller 44 may also display the total usable time (total life time). In this case, the display controller 44 may display the total usable time (total life time) on the display unit 46 in a graphic representation and display the bearing degradation information on the graph.

Figure 3:
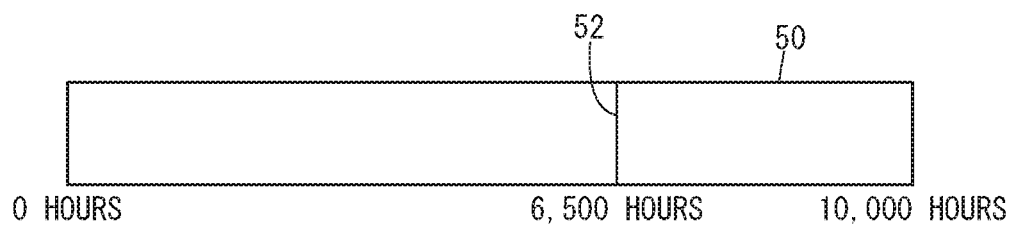
FIG. 3 is a diagram showing an example of a graph display by the display controller shown in FIG. 1.

FIG. 3 is a diagram showing an example of a graphic display. In the example shown in FIG. 3, the total usable time of the bearing 14 is 10,000 hours, and the display controller 44 displays the total usable time of 10,000 hours as a graph (bar graph) 50. Then, the display controller 44 superimposes and displays the position of the bearing degradation information calculated by the bearing degradation calculator 38 within the total usable time on the graph 50. In the example shown in FIG. 3, the bearing degradation information is set at 6,500 hours, the display controller 44 displays an indicator 52 at a position corresponding to 6,500 hours of the total usable time of 10,000 hours with a text of 6,500 hours. This display of information enables the operator to recognize the remaining usable time (3,500 hours).

Further, the display controller 44 may graphically display the total usable time of the bearing 14 with gradation of lightness depending on the degree of degradation of the bearing 14. For example, of the total usable time (10,000 hours), an area where the degree of degradation is small is displayed with high lightness, and as the degree of degradation increases, the displayed lightness is lowered. In the graph 50, the degree of degradation is minimum at zero hour (degree of degradation is zero), and the position of 10,000 hours has the greatest degree of degradation. It should be noted that the display controller 44 may display the graph with saturation and hue varied depending on the degree of degradation. That is, the display controller 44 changes at least one attribute among the three attributes of hue, saturation and lightness, depending on the degree of degradation of the bearing 14, so as to graphically display the total usable time of the bearing 14.

When the information indicating that the replacement time has come is sent from the replacement timing decider 42, the display controller 44 causes the display unit 46 to display a message prompting replacement of the bearings 14. For an exemplary case where the second level of degradation has been set to be equal to the first level of degradation, the replacement timing decider 42 determines that the replacement time has come when the bearing degradation information reaches 10,000 hours. In another case where the second level of degradation has been set lower than the first level of degradation, the replacement timing decider 42 determines that the replacement time has come when the bearing degradation information reaches a time (for example, 9,000 hours) shorter than 10,000 hours.

Next, the operation of the bearing diagnosing device 16 will be described with reference to a flowchart shown in FIG. 4. In the operation shown in FIG. 4, it is assumed that the speed sensor 20 and the temperature sensor 22 periodically detect the rotation speed (rotation rate) V and the temperature T.

At step S1, the rotation speed obtainer 30 acquires the rotation speed (rotation rate) V of the spindle 12 based on the latest detection signal from the speed sensor 20.

Next, at step S2, the temperature obtainer 32 acquires the temperature T of the bearing 14 based on the latest detection signal from the temperature sensor 22.

Subsequently, at step S3 the spindle operation storage controller 34 stores the time of rotation (cumulative time) S of the spindle 12 into the memory location for the class corresponding to the rotation speed V acquired at step S1 and the temperature T acquired at step S2, among the multiple classes in the table 36a.

Next, at step S4 the bearing degradation calculator 38 multiplies the rotation time S by the coefficient K for each class to correct the rotation time S.

Next, at step S5 the bearing degradation calculator 38 calculates bearing degradation information by summing the corrected rotation times S (rotation times S') for all classes. At this time, the remnant life time calculator 40 may calculate the remaining usable time (remnant life time) of the bearing 14 based on the calculated bearing degradation information.

Next, at step S6 the display controller 44 causes the display unit 46 to display the state of the bearing 14 based on the bearing degradation information calculated at step S5. The display controller 44 may display the state of the bearing 14 by displaying the bearing degradation information or may display the state of the bearing 14 by displaying the remaining usable time. Alternatively, as shown in FIG. 3, the display controller 44 may display the total usable time of the bearing 14 in a graphic representation and may display the bearing degradation information (indicator 52) on the graph 50.

Next, at step S7 the replacement timing decider 42, based on the bearing degradation information calculated at step S5, determines whether or not the replacement time of the bearing 14 has arrived. When the bearing degradation information exceeds the replacement time representing the second level of degradation, the replacement timing decider 42 determines that the replacement time has been reached.

When it is determined at step S7 that the replacement time has come, the control proceeds to step S8, and the display controller 44 displays on the display unit 46 a message prompting replacement of the bearing 14.

In this manner, the rotation speed (rotation rate) V of the spindle 12 and the temperature T of the bearing 14 are acquired, for each class defined by combination of rotation speed range and temperature range, the rotation time S of the spindle 12 is stored, to thereby calculate bearing degradation information based on the stored rotation times S for all classes. As a result, the bearing degradation information can be calculated in consideration of the temperature of the bearing 14. Therefore, the calculation accuracy of the bearing degradation information can be improved, and so is the diagnosis accuracy of the bearing 14.

[Technical Idea Obtained from Embodiment]

Technical ideas that can be grasped from the above embodiment will be described below.

<First Technical Idea>

A bearing diagnosing device (16) for diagnosing degradation of a bearing (14) rotatably supporting a spindle (12) of a machine tool, includes: a rotation speed obtainer (30) configured to obtain the rotation speed (V) of the spindle (12); a temperature obtainer (32) configured to obtain the temperature (T) of the bearing (14); a spindle operation storage controller (34) configured to record the rotation time (S) for which the spindle (12) has rotated, at each of a plurality of classes that are defined in advance by combination of rotation speed range and temperature range, into the storage unit (36), based on the rotation speed (V) and the temperature (T); and a bearing degradation calculator (38) configured to calculate bearing degradation information representing the degree of degradation of the bearing (14), based on the rotation time (S) at each of the classes, stored in the storage unit (36).

With this configuration, it is possible to calculate bearing degradation information in consideration of the temperature of the bearing (14). Therefore, the calculation accuracy of the bearing degradation information can be improved, and so can the diagnostic accuracy of the bearing (14).

The bearing degradation calculator (38) may be configured to correct the rotation time (S) at each class by multiplying the rotation time (S) for each class by a predetermined coefficient (K) for the class, and calculate the bearing degradation information by summing up the corrected rotation times (S) for all the classes. As a result, it is possible to calculate the bearing degradation information easily and to further improve the calculation accuracy of the bearing degradation information. Therefore, the diagnostic accuracy of the bearing (14) can be further improved.

The coefficient (K) for each class is prepared to convert the rotation time (S) for the class into an equivalent rotation time representing the rotation time (S) that will produce the same degree of degradation when the spindle (12) is turned at a rotation speed (Vs) and a temperature (Ts) corresponding to a predetermined class of the multiple classes. Thereby, the calculation accuracy of the bearing degradation information can be further improved.

The bearing diagnosing device (16) may further include a display controller (44) configured to display the bearing degradation information on a display unit (46). This enables the operator to recognize the degree of degradation of the bearing (14).

The display controller (44) may be configured to display on the display unit (46) the total usable time of the bearing (14) until the degree of degradation of the bearing (14) reaches a first level of degradation in a graph representation and display the bearing degradation information on the graph. Thereby, the operator can easily recognize the relationship between the total usable time of the bearing (14) and the degree of degradation of the current bearing (14), and also the remaining usable time of the bearing (14).

The display controller (44) may be configured to display the total usable time of the bearing (14) in a graph representation by changing at least one of three color attributes of hue, saturation and lightness, according to the degree of degradation of the bearing (14).

The bearing diagnosing device (16) may further include: a remnant life time calculator (40) configured to calculate a remaining usable time of the bearing (14) until the degree of degradation of the bearing (14) reaches a first level of degradation, based on the bearing degradation information; and a display controller (44) configured to display the remaining usable time on a display unit (46). This enables the operator to recognize the remaining usable time of the bearing (14).

The bearing diagnosing device (16) may further include: a replacement timing decider (42) configured to determine whether or not the degree of degradation of the bearing (14) has reached a second level of degradation based on the bearing degradation information; and a display controller (44) configured to display on a display unit (46) a message that prompts a replacement of the bearing (14) when the replacement timing decider (42) determines that the degree of degradation of the bearing (14) has reached the second level of degradation. As a result, the operator can recognize that the replacement time of the bearing (14) has come.

<Second Technical Idea>

A bearing diagnosing method for diagnosing degradation of a bearing (14) rotatably supporting a spindle (12) of a machine tool includes: a rotation speed obtaining step of obtaining the rotation speed (V) of the spindle (12); a temperature obtaining step of obtaining the temperature (T) of the bearing (14); a spindle operation storage controlling step of recording the rotation time (S) for which the spindle (12) has rotated, at each of a plurality of classes that are defined in advance by combination of rotation speed range and temperature range, into the storage unit (36), based on the rotation speed (V) and the temperature (T); and a bearing degradation calculating step of calculating bearing degradation information representing the degree of degradation of the bearing (14), based on the rotation time (S) at each of the classes, stored in the storage unit (36).

With this method, it is possible to calculate bearing degradation information in consideration of the temperature of the bearing (14). Therefore, the calculation accuracy of the bearing degradation information can be improved, and so can the diagnostic accuracy of the bearing (14).

The bearing degradation calculating step may correct the rotation time (S) at each class by multiplying the rotation time (S) for each class by a predetermined coefficient (K) for the class, and calculate the bearing degradation information by summing up the corrected rotation times (S) for all the classes. As a result, it is possible to calculate the bearing degradation information easily and to further improve the calculation accuracy of the bearing degradation information. Therefore, the diagnostic accuracy of the bearing (14) can be further improved.

The coefficient (K) for each class is prepared to convert the rotation time (S) for the class into an equivalent rotation time (S) representing the rotation time (S) that will produce the same degree of degradation when the spindle (12) is turned at a rotation speed (Vs) and a temperature (Ts) corresponding to a predetermined class of the multiple classes. Thereby, the calculation accuracy of the bearing degradation information can be further improved.

The bearing diagnosing method may further include a display controlling step of displaying the bearing degradation information on a display unit (46). This enables the operator to recognize the degree of degradation of the bearing (14).

The display controlling step may display on the display unit (46) the total usable time of the bearing (14) until the degree of degradation of the bearing (14) reaches a first level of degradation in a graph representation and displays the bearing degradation information on the graph. Thereby, the operator can easily recognize the relationship between the total usable time of the bearing (14) and the degree of degradation of the current bearing (14), and also the remaining usable time of the bearing (14).

The bearing diagnosing method may further include: a remnant life time calculating step of calculating a remaining usable time of the bearing (14) until the degree of degradation of the bearing (14) reaches a first level of degradation, based on the bearing degradation information; and a display controlling step of displaying the remaining usable time on a display unit (46). This enables the operator to recognize the remaining usable time of the bearing (14).

The bearing diagnosing method may further include: a replacement timing deciding step of determining whether or not the degree of degradation of the bearing (14) has reached a second level of degradation based on the bearing degradation information; and a display controlling step of displaying on a display unit (46) a message that prompts a replacement of the bearing (14) when the replacement timing deciding step determines that the degree of degradation of the bearing (14) has reached the second level of degradation. As a result, the operator can recognize that the replacement time of the bearing (14) has come.

Although certain preferred embodiments of the present invention have been shown and described in detail, it should be understood that various changes and modifications may be made therein without departing from the scope of the appended claims.

What is claimed is:

1. A bearing diagnosing device for diagnosing degradation of a bearing rotatably supporting a spindle of a machine tool, comprising:
    a rotation speed obtainer configured to obtain a rotation speed of the spindle;
    a temperature obtainer configured to obtain a temperature of the bearing;
    a spindle operation storage controller configured to record a rotation time for which the spindle has rotated, at each of a plurality of classes that are defined in advance by combination of rotation speed range and temperature range, into a storage unit, based on the rotation speed and the temperature; and
    a bearing degradation calculator configured to calculate bearing degradation information representing a degree of degradation of the bearing, based on the rotation time at each of the classes, stored in the storage unit,
    wherein the bearing degradation calculator is configured to correct the rotation time at each class by multiplying the rotation time for each class by a predetermined coefficient for the class to calculate a corrected rotation time, which becomes relatively longer in a class with a higher rotation speed and in a class with a higher temperature and calculate the bearing degradation information by summing up the corrected rotation times for all the classes.

2. The bearing diagnosing device according to claim 1, wherein the corrected rotation time represents the rotation time that will produce a same degree of degradation when the spindle is turned at a rotation speed and a temperature corresponding to a predetermined class of the multiple classes.

3. The bearing diagnosing device according to claim 2, further comprising:
    a remnant life time calculator configured to calculate a remaining usable time of the bearing until the degree of degradation of the bearing reaches a first level of degradation, based on the bearing degradation information; and
    a display controller configured to display the remaining usable time on a display unit.

4. The bearing diagnosing device according to claim 2, further comprising:
    a replacement timing decider configured to determine whether or not the degree of degradation of the bearing has reached a second level of degradation based on the bearing degradation information; and
    a display controller configured to display on a display unit a message that prompts a replacement of the bearing when the replacement timing decider determines that the degree of degradation of the bearing has reached the second level of degradation.

5. The bearing diagnosing device according to claim 1, further comprising a display controller configured to display the bearing degradation information on a display unit.

6. The bearing diagnosing device according to claim 5, wherein the display controller is configured to display on the display unit a total usable time of the bearing until the degree of degradation of the bearing reaches a first level of degradation in a graph representation and display the bearing degradation information on the graph.

7. The bearing diagnosing device according to claim 6, wherein the display controller is configured to display the total usable time of the bearing in a graph representation by changing at least one of three color attributes of hue, saturation and lightness, according to the degree of degradation of the bearing.

8. A bearing diagnosing method for diagnosing degradation of a bearing rotatably supporting a spindle of a machine tool, comprising:
    a rotation speed obtaining step of obtaining a rotation speed of the spindle;
    a temperature obtaining step of obtaining a temperature of the bearing;
    a spindle operation storage controlling step of recording a rotation time for which the spindle has rotated, at each of a plurality of classes that are defined in advance by combination of rotation speed range and temperature range, into a storage unit, based on the rotation speed and the temperature; and
    a bearing degradation calculating step of calculating bearing degradation information representing a degree of degradation of the bearing, based on the rotation time at each of the classes, stored in the storage unit,
    wherein the bearing degradation calculating step corrects the rotation time at each class by multiplying the rotation time for each class by a predetermined coefficient for the class to generate a corrected rotation time, which becomes relatively longer in a class with a higher rotation speed and in a class with a higher temperature and calculates the bearing degradation information by summing up the corrected rotation times for all the classes.

9. The bearing diagnosing method according to claim 8, further comprising a display controlling step of displaying the bearing degradation information on a display unit.

10. The bearing diagnosing method according to claim 9, wherein the display controlling step displays on the display unit a total usable time of the bearing until the degree of degradation of the bearing reaches a first level of degradation in a graph representation and displays the bearing degradation information on the graph.

11. The bearing diagnosing method according to claim 8, wherein the corrected rotation time represents the rotation time that will produce the same degree of degradation when the spindle is turned at a rotation speed and a temperature corresponding to a predetermined class of the multiple classes.

12. The bearing diagnosing method according to claim 11, further comprising:
- a remnant life time calculating step of calculating a remaining usable time of the bearing until the degree of degradation of the bearing reaches a first level of degradation, based on the bearing degradation information; and
- a display controlling step of displaying the remaining usable time on a display unit.

13. The bearing diagnosing method according to claim 11, further comprising:
- a replacement timing deciding step of determining whether or not the degree of degradation of the bearing has reached a second level of degradation based on the bearing degradation information; and
- a display controlling step of displaying on a display unit a message that prompts a replacement of the bearing when the replacement timing deciding step determines that the degree of degradation of the bearing has reached the second level of degradation.

* * * * *